United States Patent [19]

Isashi

[11] Patent Number: 4,794,840
[45] Date of Patent: Jan. 3, 1989

[54] PIANO TYPE MUSICAL INSTRUMENT

[75] Inventor: Hiroyuki Isashi, Shizuoka, Japan

[73] Assignee: Kawai Gakki Seisakusho Co., Ltd., Shizuoka, Japan

[21] Appl. No.: 26,449

[22] Filed: Mar. 17, 1987

[30] Foreign Application Priority Data

Mar. 28, 1986 [JP] Japan .............................. 61-44870[U]

[51] Int. Cl.$^4$ .............................................. G09B 15/04
[52] U.S. Cl. ........................................ 84/467; 84/478
[58] Field of Search ........................... 84/404, 478, 467

[56] References Cited

U.S. PATENT DOCUMENTS

| | | | |
|---|---|---|---|
| 2,159,491 | 5/1939 | Rose | 84/404 |
| 2,788,697 | 4/1957 | Anthony | 84/404 |
| 2,791,147 | 5/1957 | Meadows | 84/470 |
| 4,203,344 | 5/1980 | Krosnick | 84/404 X |

FOREIGN PATENT DOCUMENTS 31-19658 12/1956 Japan .
35-20222 8/1960 Japan .

Primary Examiner—Lawrence R. Franklin
Attorney, Agent, or Firm—Holman & Stern

[57] ABSTRACT

A piano type music instrument having playable keys provided in the front of the box, with a sound maker connecting to the keys to make a sound corresponding to the key pressed. A music scale is printed on the box, and in the scale holes are located in the positions corresponding to the music scale notes. A rod inserted in each hole is supported by a link or a pliable tongue member made of thin metal, hard paper of plastic material. The tail ends of the keys are located beneath the pliable tongue or the rod so as to push up and down on the rods smoothly. When a key is pressed down, a corresponding note rod is made to protrude up through a corresponding hole in the printed musical scale, to identify the musical note played and sounded.

1 Claim, 2 Drawing Sheets

PIANO TYPE MUSICAL INSTRUMENT

BACKGROUND OF THE INVENTION

This invention relates to the improvement of piano type toys for children to learn the music scales on.

The existing musical instrument toy of this type only makes a sound when a key is touched, and does not show which note of the scales is played, so this existing instrument could not improve the sense of which key corresponds to each note sounded.

This invention provides a piano type instrument which shows the note corresponding to the sound made.

An object of the invention is to provide a simplified mechanism for this type of musical instrument.

SUMMARY OF THE INVENTION

This musical instrument is comprised of a case having a base plate, side walls, and a top plate. In the case, a sound maker is placed on the base plate, keys are provided in the front of the case and connecting to the sound maker.

On the surface of the top plate, a music scale is printed, and holes are made on the positions of the notes of the scale, through which rods having printed musical notes on the top thereof are provided to be movable up and down.

In the improved mechanism of the movement between the top plate and the keys, a plate is placed with one end of the plate fixed to a support, and the other end of the plate is attached to the rod. A tail portion of each key is located behind the plate, or lower end of the rod.

When a key of the instrument is touched, a corresponding sound is made by the sound maker, with the rods showing which note is sounded. By returning the key, the rod is made to decend by its own weight or the returning force of the plate.

DESCRIPTION OF PREFERRED EMBODIMENTS

Figure 4:
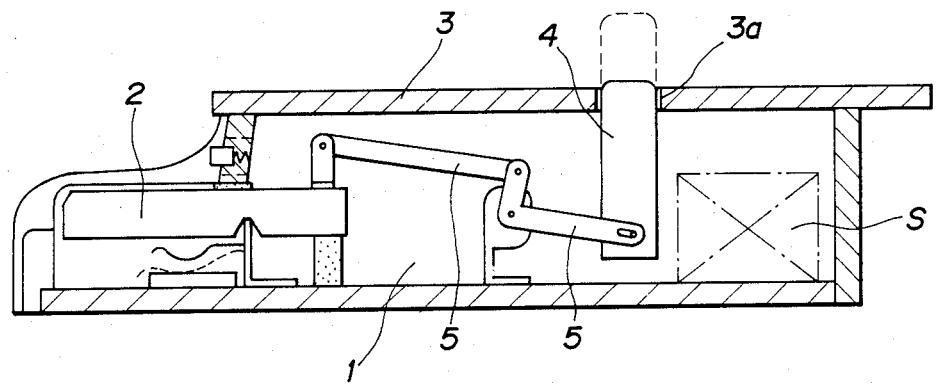
FIG. 4 shows a cross-sectional side view of the mechanism of the basic embodiment of this invention.

The basic embodiment of this invention is shown in FIG. 4.

Inside the instrument case 1, a sound creating device S is installed, and touch keys 2 are pivotally engaged in front of the case. On the surface of the upper plate 3, a music scale is printed.

In the scale, holes 3a are provided in the position of each note, and a rod 4 is installed through each hole. Rods 4 are each connected to the keys 2 by means of links 5.

When a key 2 is pushed down, the relevant rod 4 is pushed up through the hole 3a up on the scale showing which note is sounded.

This instrument can show to the children which note is sounded, but the mechanism of the instrument is rather complicated because each key is connected to the rod by means of links and levers. It requires many parts and a longer assembly time. On top of that, the rod motion is not sometimes so smooth as expected.

Figure 1:
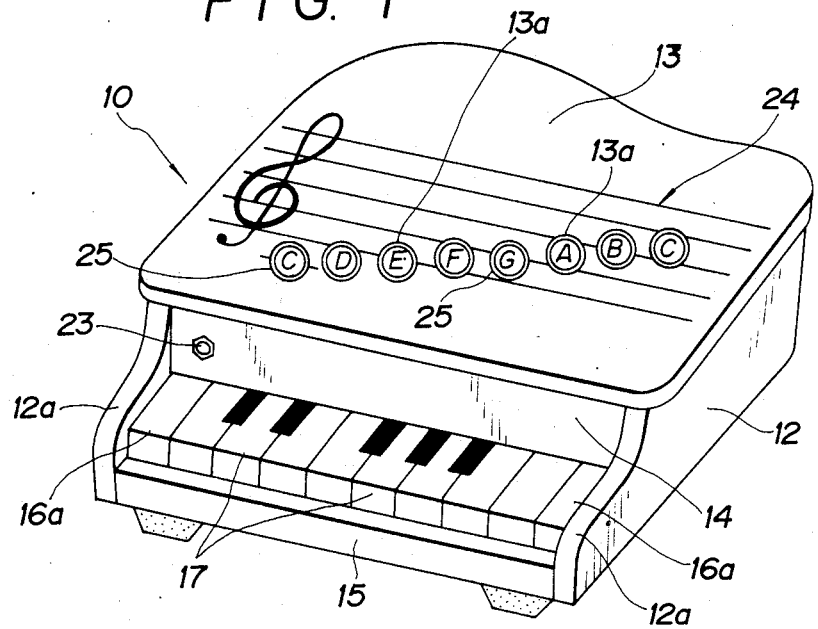
FIG. 1 shows a perspective view of a piano type music instrument.
Figure 2:
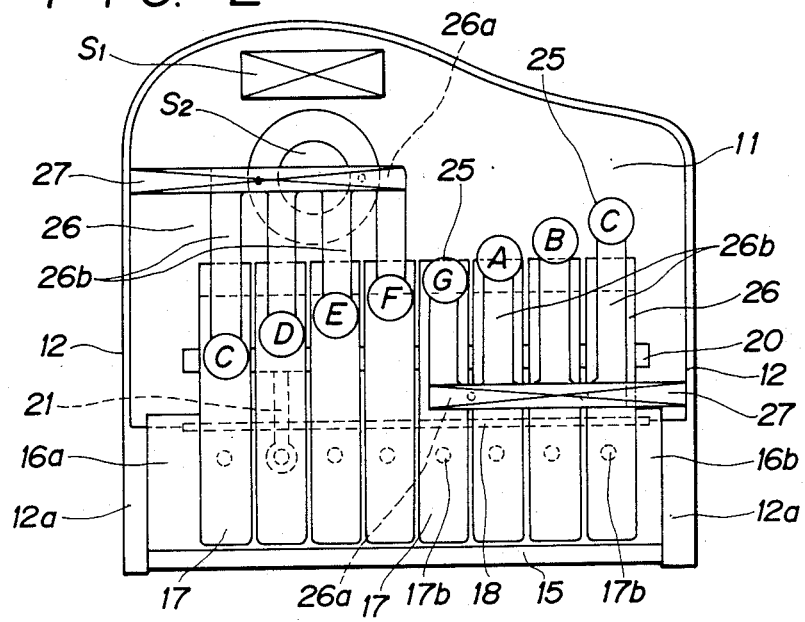
FIG. 2 is a cross-sectional plan view of FIG. 1.
Figure 3:
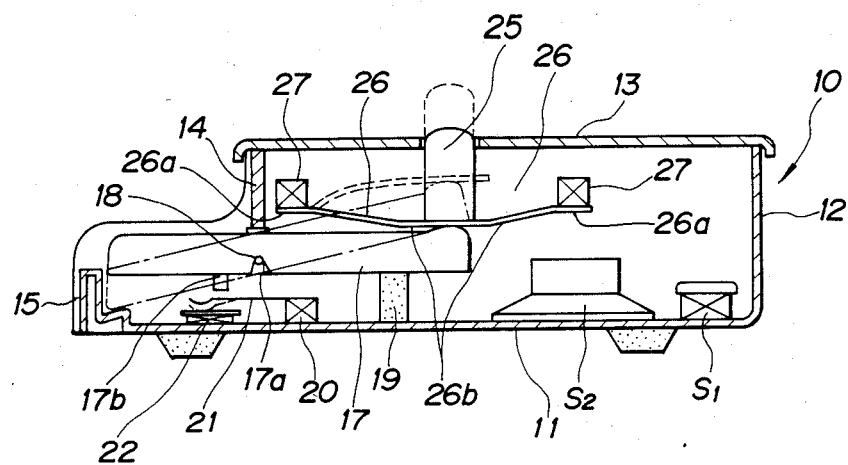
FIG. 3 is a cross-sectional side view of FIG. 1.

The second embodiment of this invention is shown in FIG. 1 through FIG. 3. Case 10 has the shape of a grand piano, which is composed of a base plate 11, side panel 12 having an inverted U shape, and a top plate 13. From the leading edge of the top plate 13, a cover plate 14 extends downwardly, and another cover plate 15 is provided in the front of the case 10.

In the front of the case 10, keys 17 corresponding to one full octave are installed to be movable, and at both sides of the keyboard are fixed blocks 16a, 16b. Each key 17 has a notch 17a as shown in FIG. 3, a supporting bar 18 being fixed between the blocks 16a, 16b supports all the keys. Each key 17 has a projection 17b to push an electric switch, and the front end of each key is supported on a key rest 19 made of wood or felt.

The base plate 11 of the case 10 has a bar 20 fixed on the surface of the base plate, and on the bar 20 is attached an end of a spring contact 21, the other end of which is located between the projection 17b of the key 17 and an electric base contact 22. Each base contact 22 is connected to the sound maker S1 and the speaker S2. On one side of the plate 14 is placed a main electric switch 23.

On the top plate 13, the music scale 24 is printed as shown in FIG. 1, and holes 13a are located in the positions corresponding to musical notes.

In each hole 13a, is placed a rod 24 which has a different color or musical note printed on the top or side surface thereof. Each rod is arranged to stay at the same level as the top plate when unoperated.

Between the top plate 13 and the keys 17, are attached two support plates 26 made of metal, hard paper or plastic, each of which is comprised of a base portion 26a located transversely to the keys, and pliable tongues (four tongues are shown in FIG. 2), each a different length and extending to support the rods 24. Base portion 26a of the plate 26 is supported by a member 27 fixed to the base plate 11, or the side plate 12, or the top plate 13.

The tail end of each key 17 is located to face beneath the tongue 26b.

The operation of this instrument is as follows.

Switching on the switch 23, the sound maker S is ready to operate. When a key 17 is touched down, its projection 17b presses down the spring switch 21 to touch the base switch 22 as shown in FIG. 3, and the note sound corresponding to the key (for example note "G") is created by the sound maker.

At the same time, the corresponding pliable tongue 26b of the support plate 26 is bent upwardly, pushing up a rod 25 from the top plate 13 showing which note is sounded on the music scale 24.

Upon releasing the key 17, the rod 25 descends by its own weight or the returning force of the tongue 26b, and the key 17 returns to its ready position stopping the sound.

Through the device's operation, the operator enjoys music and an identification of which note is sounded.

While in the above mentioned embodiment it is described that the instrument has sound note rods 25 corresponding to show one octave of the musical scale, and two sets of support plates 26, more rods can be installed in a bigger instrument, and the support plates 26 can be united to be one unit, or separated into three or more units.

As shown and described above, with this piano type musical instrument comprising the keys connecting to the sound maker, the music scale printed on the top plate, many rods arranged to the position of each musical note to show each note played, the operator of the instrument can enjoy making music, knowing which note of the scale is sounded.

I claim:

1. A piano type musical instrument comprising:
a case having a base plate, side walls enclosing sides and a rear of said case, and a top plate;
an electrically operated sound making means provided in said case;
a plurality of manually playable keys arranged in a front part of said case, said keys when pressed closing switch means for operating said sound making means to sound a musical note corresponding to the key pressed;
a musical note scale on a surface of said top plate;
holes provided in said top plate at locations corresponding to each note of said musical scale; and
a music note rod inserted in each said hole in said top plate, top ends of said music note rods being normally level with said top plate, said music note rods moving up through their respective holes when a corresponding key is pressed down, for identifying on said musical note scale a corresponding musical note played and sounded, said music note rods moving down in their respective holes when said keys corresponding thereto are released, a lower end of each said music note rod being attached to one end of a corresponding pliable tongue, said corresponding pliable tongues each having a different length, the other ends of said pliable tongues being fixed between said top plate and said keys by a support plate, a tail end of each said key extending beneath a corresponding one of said pliable tongues to which a corresponding one of said music note rods is attached.

* * * * *